United States Patent [19]

Callahan et al.

[11] Patent Number: 5,012,433
[45] Date of Patent: Apr. 30, 1991

[54] MULTISTAGE CLIPPING METHOD

[75] Inventors: Robert M. Callahan, Woodstock; Bruce C. Hempel, Tivoli; Bob C. Liang, West Hurley, all of N.Y.

[73] Assignee: International Business Machines Corporation, Armonk, N.Y.

[21] Appl. No.: 364,524

[22] Filed: Jun. 9, 1989

Related U.S. Application Data

[63] Continuation of Ser. No. 43,067, Apr. 27, 1987, abandoned.

[51] Int. Cl.$^5$ ............................................. G06F 15/62
[52] U.S. Cl. ..................................... 364/518; 364/521
[58] Field of Search ................ 364/518, 521; 340/723, 340/728, 731

[56] References Cited

U.S. PATENT DOCUMENTS

| | | | |
|---|---|---|---|
| 4,360,876 | 11/1982 | Girault et al. | 364/521 X |
| 4,492,956 | 1/1985 | Collmeyer et al. | 340/731 X |
| 4,653,012 | 3/1987 | Duffy et al. | 364/521 X |
| 4,736,200 | 4/1988 | Ounuma | 340/723 X |
| 4,811,241 | 3/1989 | Liang | 364/518 |

Primary Examiner—Dale M. Shaw
Assistant Examiner—Mark K. Zimmerman
Attorney, Agent, or Firm—William A. Kinnaman, Jr.; Mark S. Walker; George E. Clark

[57] ABSTRACT

A method for clipping two and three dimensional graphic primitives for use in a computer graphics workstation. During the first clipping stage, the system removes all graphic primitives which lie outside an arbitrary clipping volume or window that is an enlargement of the desired viewing volume or window. This clipping volume (window) is then projected and mapped onto a virtual viewport which is larger than the real viewport. After this mapping occurs, rendering effects (such as line styles, line width, pattern fill, hatch fill, etc.) are applied to the primitive. A subsequent stage of clipping is then applied to clip the virtual viewport to the real viewport which is the user's visible area. Use of the clipping volume (window) during the first stage of clipping makes it simpler to transform geometric primitives which are partially visible to the viewer, and gives visible primitives a richer set of invariant geometric properties so that their rendering effects may be more easily and correctly carried out.

15 Claims, 9 Drawing Sheets

LEGEND:

D = PIXEL DATA BEING WRITTEN
* = NO PIXEL DATA BEING WRITTEN
N = NOT PROTECTED AGAINST WRITING
P = PROTECTED AGAINST WRITING
C = CHANGED PIXEL
U = UNCHANGED PIXEL

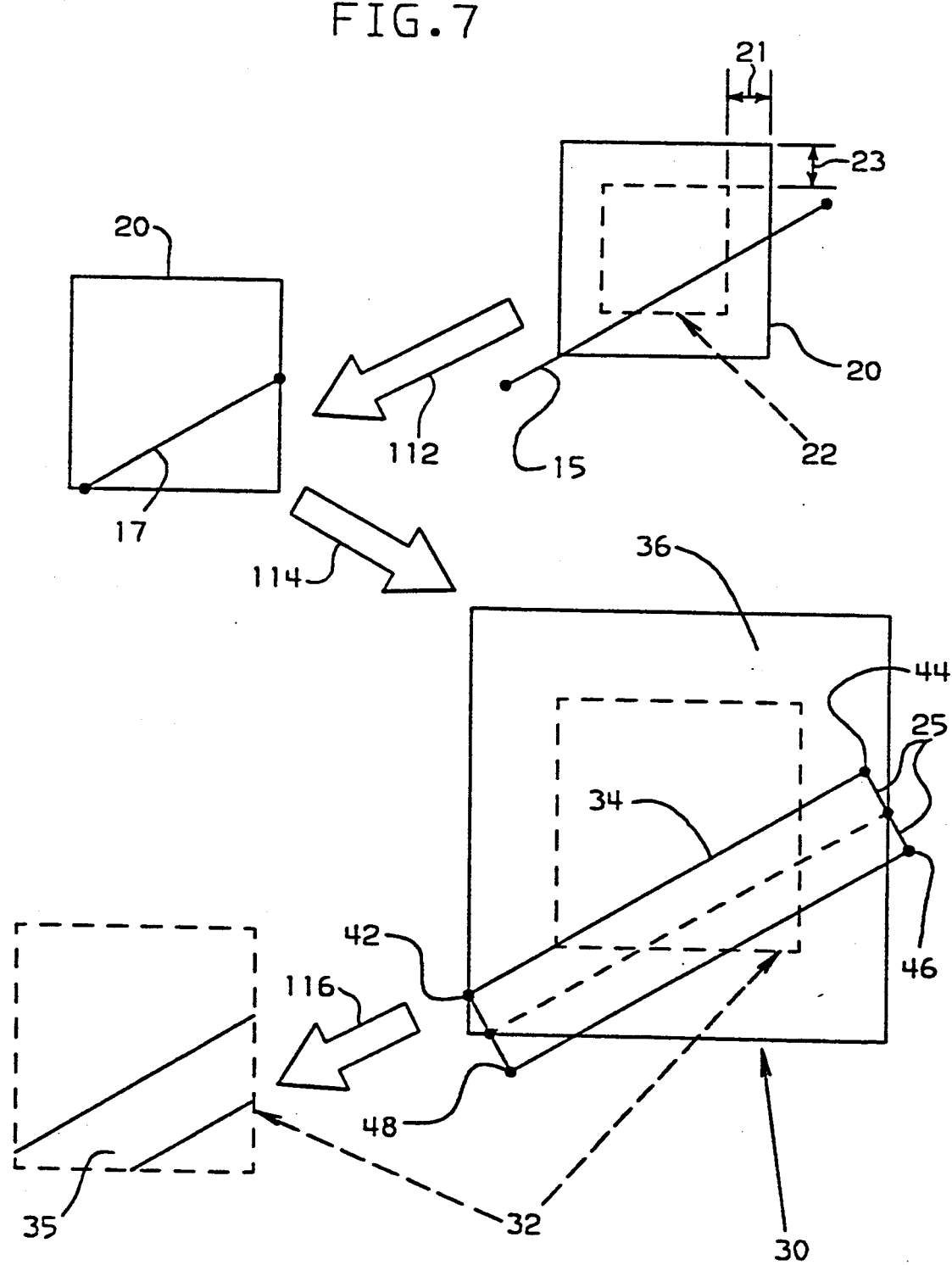

MULTISTAGE CLIPPING METHOD

This is a continuation of Application Ser. No. 07/043,067, filed Apr. 27, 1987, now abandoned.

DESCRIPTION OF THE INVENTION

1. Field of the Invention

The present invention relates to graphic display of computer processed information, and more particularly, to the computer processing and display of graphic primitives.

The process of selecting the portion of a primitive which lies within the viewer's field of vision has been termed clipping. This process involves removing those parts of the primitive which lie outside a viewing volume or window.

The clipping technique which has traditionally been employed in the prior art is to geometrically clip all primitives to the same viewing region, either on volume (3D) or a window (2D) that defines what will be displayed to the viewer. For example, if a filled circle surrounds a corner of a viewing window, the clipping process would create a new polygonal shape which is that portion of the circle that is totally within the viewing window. This new geometric shape (a many sided polygon) is considerably more complex to process that the original shape (a circle). Similarly, clipping of a simple cube may produce a complex polyhedron. Often it is difficult if not impossible to correctly apply the appropriate "rendering" attributes (such as pattern fill) to these more complex shapes.

2. Description of the Prior Art

There are many graphic clipping techniques described in the prior art; among those, are the following which are known to the inventors herein:

U.S. Pat. No. 3,816,726 is an early patent dealing with the three dimensional clipping of polygons which teaches the traditional prior art clipping method where a polygon is clipped to the boundaries of the real viewport. The patent does not teach nor suggest the multistage clipping method according to the present invention.

U.S. Pat. No. 4,412,296 teaches a clipping method for clipping prioritized objects such as symbol portions which intrude into a defined clipping area containing high priority information.

As above, this patent does not teach a method according to the present invention employing a multistage clipping process.

U.S. Pat. No. 4,449,201 teaches a pipeline processor system employing multiple processors to perform the geometry computations for a prior art system such as is shown in FIG. 1 herein.

The patent does not teach a multistage clipping method according to the present invention.

U.S. Pat. No. 4,491,836 teaches a two dimensional clipping process employing a clipper circuit for performing traditional clipping.

The patent does not teach a multistage clipping method in accordance with the present invention.

U.S. Pat. No. 4,492,956, as with the 836 patent above, covers a two dimensional clipping circuit which can also handle geometric primitives such as polygons.

As above, the patent does not teach a multistage clipping method as does the present invention.

U.S. Pat. No. 4,496,944 which is related to the 956 and the 836 patents, covers a high level architecture of a graphic display system and does not teach nor suggest a multistage clipping method in accordance with the present invention.

European Patent Application 82306987.7 teaches a method for clipping lines in a case where a clipping window and the viewport are the same. As with the patents above, this patent teaches a traditional prior are clipping process and does not teach nor suggest a multistage clipping method as does the present invention.

European Patent Application 84102127.2 teaches a numerical control machining apparatus with graphic display in which the graphic display method applies a geometry process to input data generated by the numerical control apparatus. The patent does not teach nor suggest a multistage clipping method in accordance with the present invention.

European Patent Application 84307611.8 teaches a pipeline processor system which employs multiple processors to handle the geometry computation process as does the '201 patent described above.

As with the previous patents, this patent does not teach nor suggest a two stage clipping method in accordance with the present invention.

European Patent Application 85104226.7 shows a traditional prior art method for clipping polygons. However, the patent application does not teach nor suggest a multistage clipping method in accordance with the present invention.

SUMMARY OF THE INVENTION

It is a primary object of the present invention to accurately and efficiently clip geometric primitives at viewport boundaries by a method which includes a number of clipping stages.

It is a further object of the present invention to accurately and efficiently clip geometric primitives as above by a method which further includes the steps of establishing a first clipping polyhedron larger than a desired field of view and defining a second polyhedron which is geometrically similar to the clipping polyhedron, the second polyhedron defining a volume optimizing trivial clipping.

It is yet another object of the invention to accurately and effectively clip geometric primitives as above by a method which further includes the steps of selecting the clipping polyhedron based upon the characteristics of data being processed.

Accordingly, a system for clipping two and three dimensional graphic primitives for use in a graphic workstation removes all graphic primitives which lie outside an arbitrary volume referred to as a clipping volume during a first clipping stage, mapping the clipping volume into a virtual viewport which is larger than a real viewport, performing post transformation operations as a processor clips a virtual viewport to the real viewport which represents a display screen.

It is an advantage of the present invention, that through the use of the clipping volume, geometric primitives may be transformed which are partially visible to the viewer in a more simple fashion and primitives which are visible are permitted to maintain a fuller set of invariant geometric characteristics so that post transformation operations or rendering characteristics may be efficiently handled.

The foregoing and other objects, features and advantages of the invention will be apparent from the more particular description of the Preferred Embodiments of

BRIEF DESCRIPTION OF THE DRAWING

FIG. 7 is a schematic diagram of a two stage clipping method according to a preferred embodiment of the present invention as applied to a wide line.

INTRODUCTION

The present invention allows the clipping boundaries to be specified in such a way that a partially visible primitive will not be clipped. The primitive then retains its geometric characteristics, thus allowing the rendering stage to be processed correctly. After the rendering attributes are applied, a subsequent clipping stage is applied to ensure that only those parts within the viewing volume are shown to the viewer. This subsequent clipping stage clips the graphics data to the viewport, and may be implemented on either a "per primitive" or a "per pixel" basis.

The change in the fundamental approach results in a dramatic simplification of the process. For example, in the case of rendered wide lines, the wide lines need not be geometrically defined, but can merely be defined as a central vector and an associated width. In this way, the rendered line width will not respond to zooming, and the line will not be distorted if the window-to-viewport scaling is not the same in both the X and Y directions. These advantages are achieved without increasing the requirements for processing power or storage.

PRIOR ART METHOD

In order to mimic the process by which the eye sees, most graphics systems create a representation of the primitives to be viewed in a space called world coordinate space. The process of creating and subsequently projecting a subset of this information onto a visible area called the viewport is accomplished by means of a transformation pipeline. The traditional prior art transformation pipe, FIG. 1, consists of the following steps:

1. creation of the data by transforming a geometric primitive 200 in world coordinate space defined by world coordinate space boundary 50 (transformation 101);

2. selection of the subset of the data within the viewing window S2 to be displayed (clipping 103);

3. mapping the selected subset onto the viewport S4 (mapping 10S);

4. generating the image (rasterization).

Figure 1:
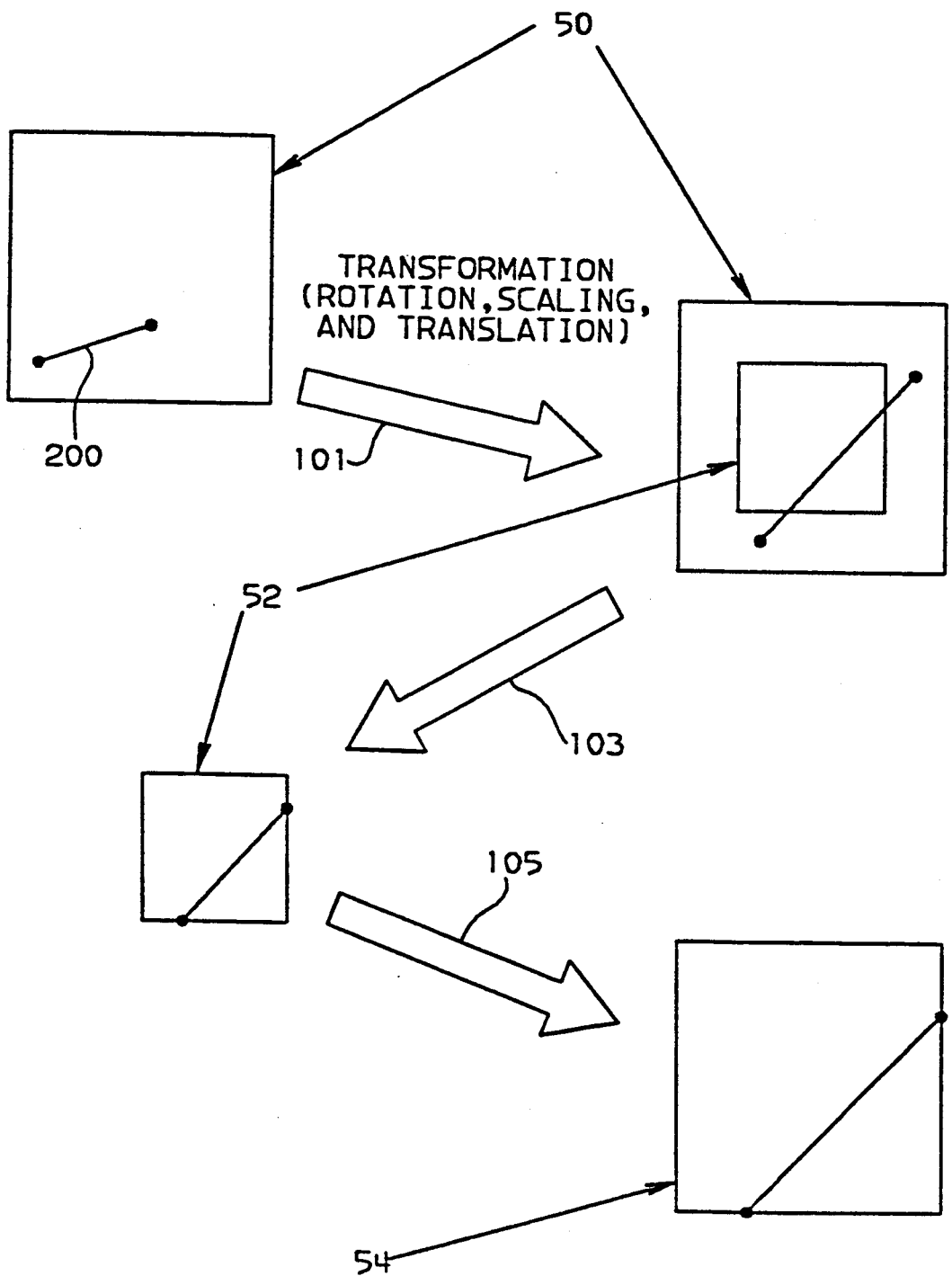
FIG. 1 is a schematic diagram of a prior art clipping and mapping process for a single line geometric primitive.

The first three steps of this process are schematically depicted in FIG. 1.

Figure 2:
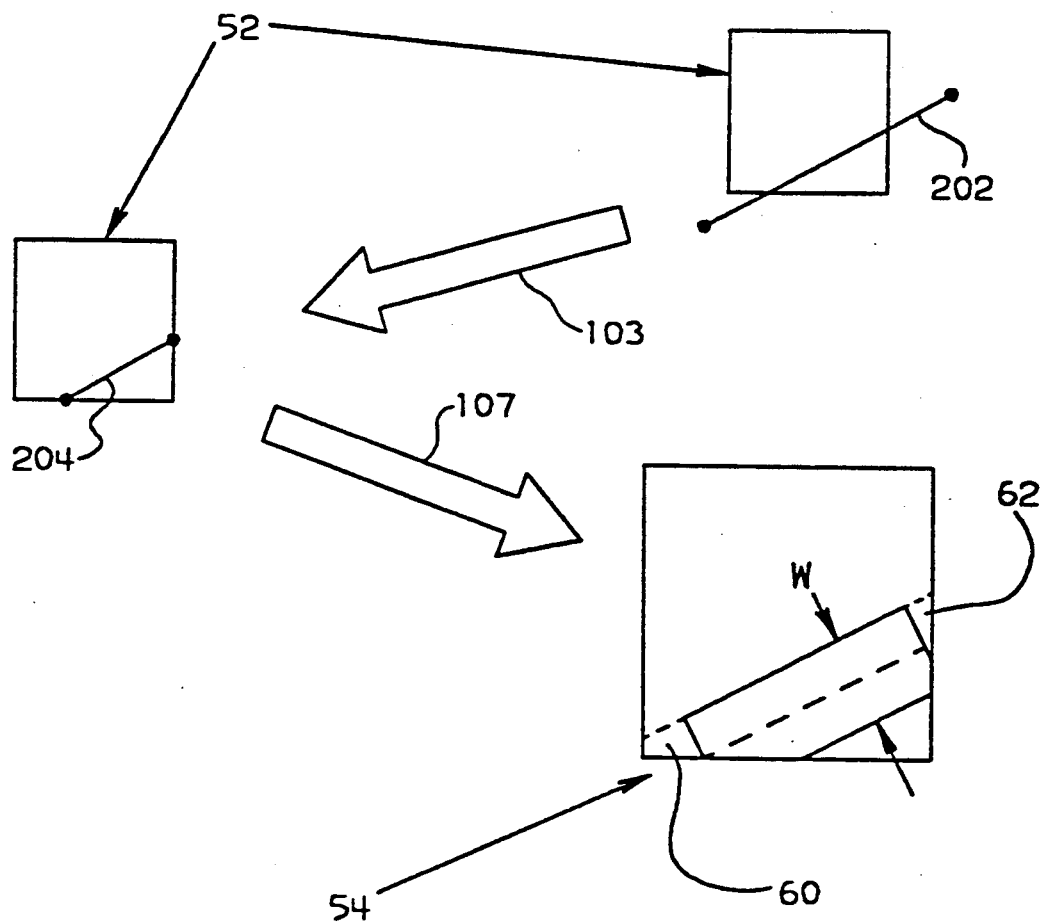
FIG. 2 is a schematic diagram of a prior art clipping and mapping process for a rendered wide line.
Figure 3:
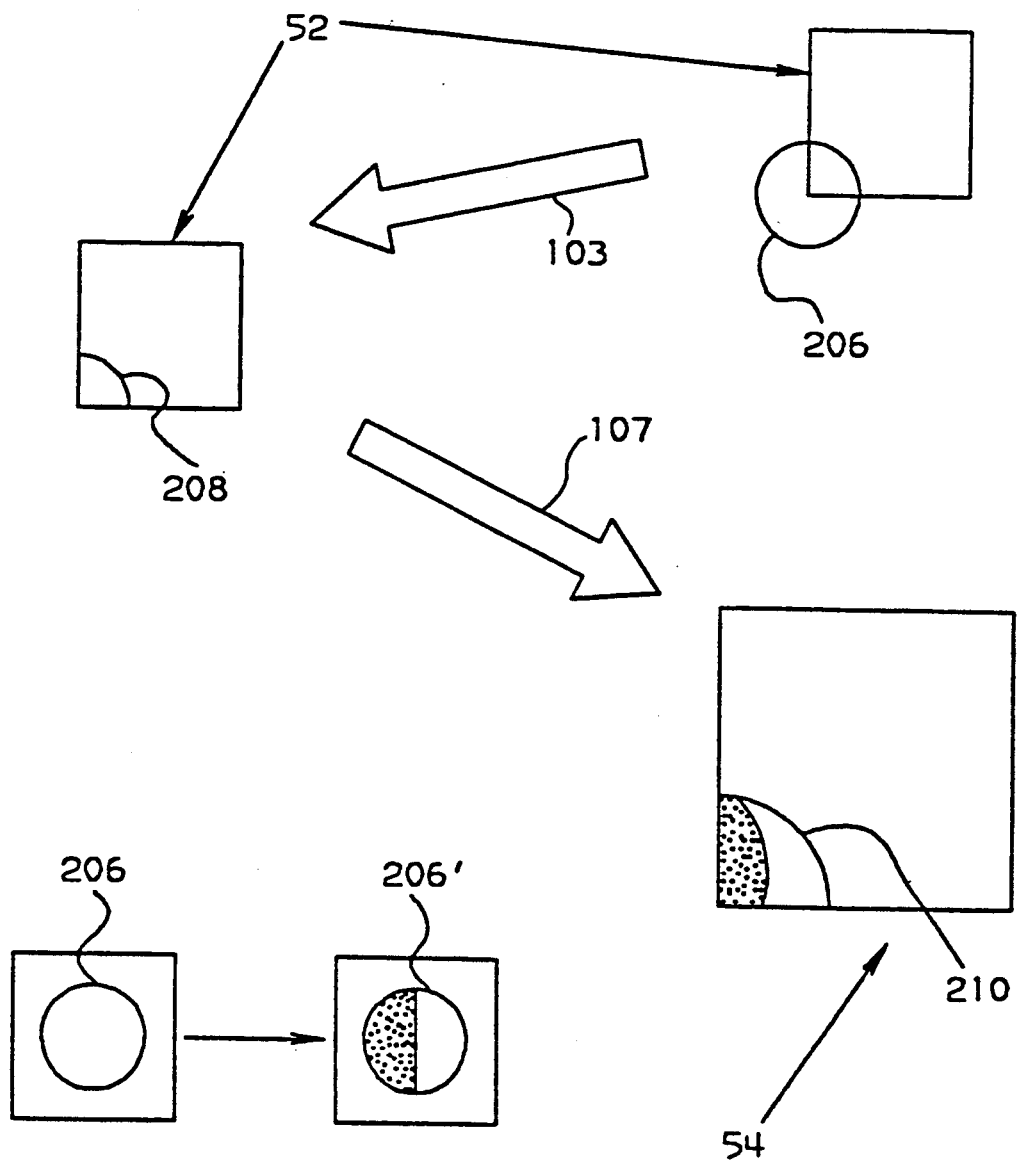
FIG. 3 is a schematic diagram of a prior art clipping and mapping process for a pattern filled circle.

This prior art pipeline works well when the data to be viewed can be easily expressed graphically after clipping, as is the case with simple vectors. However, when this is not the case, the following shortcomings become apparent:

1. Useful geometric information may be lost when geometric primitives lose their identity as a result of clipping. This greatly increases the difficulty of creating the correct image for the viewer, sometimes to the point of impossibility. FIG. 2 and FIG. 3 describe two such cases.

FIG. 2 illustrates the prior art method of clipping and rendering a wide line. In a geographic information system application, a physical feature such as a road may be defined as a geometric primitive, e.g. a line with an attribute indicating the overall width. In the final presentation of the road on the display, the vector representing the road is expanded into the full width for display (this is known as rendering). FIG. 2 illustrates the deficiencies of the prior art in the mapping and rendering of a wide line. The initial line 202 is clipped 103 into the viewing window 52 resulting in line 204. The mapping and rendering step 107 maps the vector to the viewport and expands the vector into a figure with width w. As can be seen from FIG. 2 areas 60 and 62 do not contain sections of the road because the line was widened after clipping. Thus, valuable information is lost.

FIG. 3 illustrates the effect of prior art clipping and mapping of a pattern filled circle. In this case the geometric primitive is circle 206 which has an attribute indicating that one half of the circle is to be filled with a pattern. The desired result would appear as 206' as shown in the figure. As shown in FIG. 3, clipping step 103 results in a portion 208 being clipped into the viewing window 52. Mapping and rendering step 107 maps clipped portion 208 to viewport 54 and applies the attribute indicating a requirement for pattern filling half the figure, resulting in object 210 being displayed. As can be seen from FIG. 3, the application of the attribute indicating to fill half the object results in an incorrect final representation of the figure.

2. In cases in which a complex geometric primitive is used many times in an image (such as filled circles being used to represent vias on a circuit board), the prior art process is costly in terms of execution time since every instance of an identical complex primitive must be run through the complete clipping process.

DESCRIPTION OF PREFERRED EMBODIMENT OF THE PRESENT INVENTION

To overcome these shortcomings, an improved transformation pipeline uses the concepts of a three dimensional clipping volume (window) or clipping polyhedron that is an enlargement of the viewing volume (window), and a virtual viewport that is an enlargement of real viewport. This improved transformation pipeline consists of the following steps: (See FIG. 4)

1. creation of the data in world coordinate space (transformation 110);

2. selection of a subset of the data which contains the data to be displayed (first stage of clipping 112);

3. mapping the selected subset onto the virtual viewport (mapping 114);

4. elimination of those parts of the virtual viewport that should not be displayed (second stage of clipping 116);

5. generating the image (rasterization 118).

The first stage of clipping 112 in the new method is similar to the clipping 103 performed in the traditional method, except that it uses a clipping volume (window) that is different than the actual viewing volume (window) and it can operate on simpler representations of primitives (e.g., a central vector and a width for a wide line, or a position and radius for a circle) since a subsequent stage of clipping will take care of the final result. A different clipping volume (window) may be used for each type of primitive. The amount by which the viewing volume (window) should be enlarged to obtain the clipping volume (window) boundaries is usually a function of the size of the primitive being processed (for example, w, the width, in the case of a wide line; r, the radius, in the case of a circle; w, the width of the character box, in the case of a character; and so on; see FIG. 9). When the primitive's size is a rendering attribute, the function used to obtain the clipping volume (window) boundaries must take into account the zoom or shrink effects of the mapping process, since the first stage of clipping takes place prior to mapping. In addition, a different clipping volume (window) may be used for determining whether a primitive may be trivially accepted or rejected than is used when a clip is required.

The mapping 114 in the method according to the present invention is similar to the mapping 105 done in prior art methods, except that it maps the clipping window to the virtual viewport instead of mapping the viewing window to the real viewport.

The subsequent stage of clipping 116 discards those portions of the virtual viewport that lie outside the real viewport. It may be implemented in one of the following ways:

1. As a separate step in the transformation pipeline after the mapping 114 and before rasterization 118; in this case, the clipping is done against the actual viewport on a primitive-by-primitive basis. This can be done in microcode, avoiding the cost of additional hardware.

2. As a separate step in the transformation pipeline after the rasterization process 118; in this case, the pixel processor hardware can be designed to discard pixel data according to one or both of the following criteria:

a. The pixel data does not lie within acceptable minimum/maximum limits (such as the real viewport, or a real view volume in a solids or shading graphics system).

b. The pixel data is "masked off" for update by an update mask. Such an update mask (one bit for every pixel in the system) could be defined prior to the processing of a graphic primitive. This criteria allows for the creation of arbitrarily shaped viewports. This is shown in FIG. 5 and FIG. 6.

Figure 5:
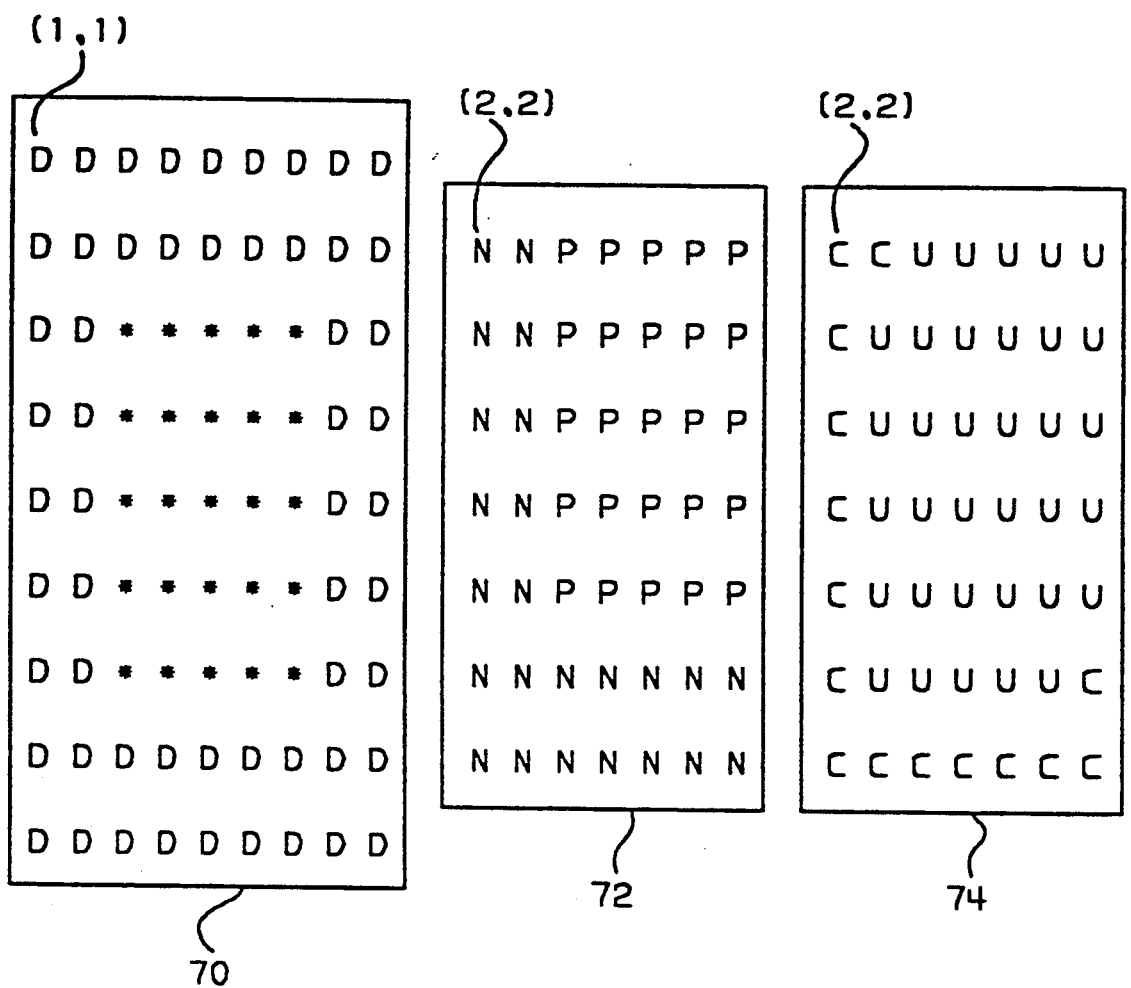
FIG. 5 is a schematic diagram of viewport clipping masks in accordance with an embodiment of the present invention.

FIG. 5 is a representation of the pixel data contained in a virtual viewport 70, a mask for the real viewport 72, and the resulting real viewport 74. The virtual viewport 70 contains the data which, absent a mask, would be written to the real viewport. The virtual viewport is defined beginning at row 1, column 1 and is shown, in the example, as a 9×9 matrix. A mask 72 may be defined which protects certain areas of the frame buffer against writing. The mask in the example is defined starting a row 2, column 2, it is a 7×7 matrix corresponding to the resulting viewport 74. The mask 72 is applied to the source 70 so that pixels are modified in real viewport 74 only when a pixel is both modified in virtual viewport 70 and is allowed to be written by mask 72. The real viewport 74 shows the result of this operation.

Figure 6:
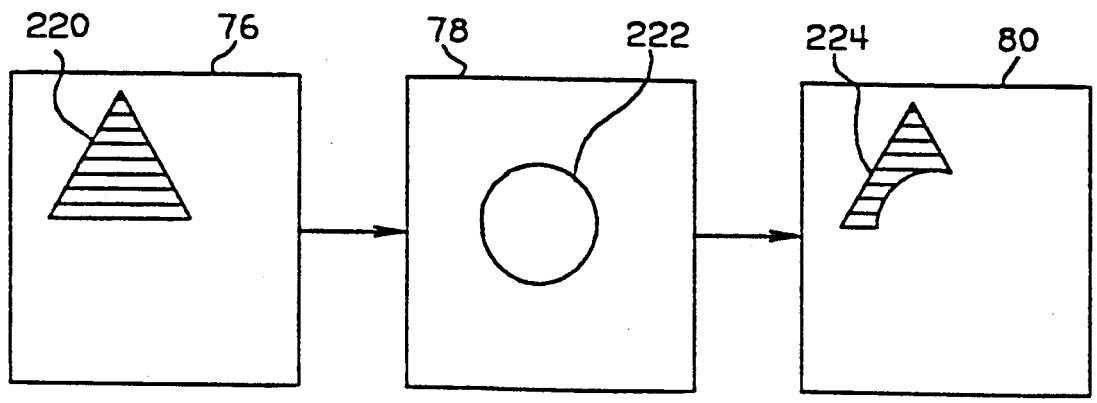
FIG. 6 is a schematic diagram of the process for virtual to real viewport clipping employing a mask.

FIG. 6 is a graphical illustration of this process. Virtual viewport 76 sends the figure desired to be drawn as a striped triangle 220. The mask 78 defines a circle to mask the final viewport. The resultant viewport 80 shows the desired triangle 220 as masked by circle 222.

The advantages of performing the final clipping stage after the rasterization process are very good performance and the ability to have arbitrarily complex viewport shapes.

Figure 8:
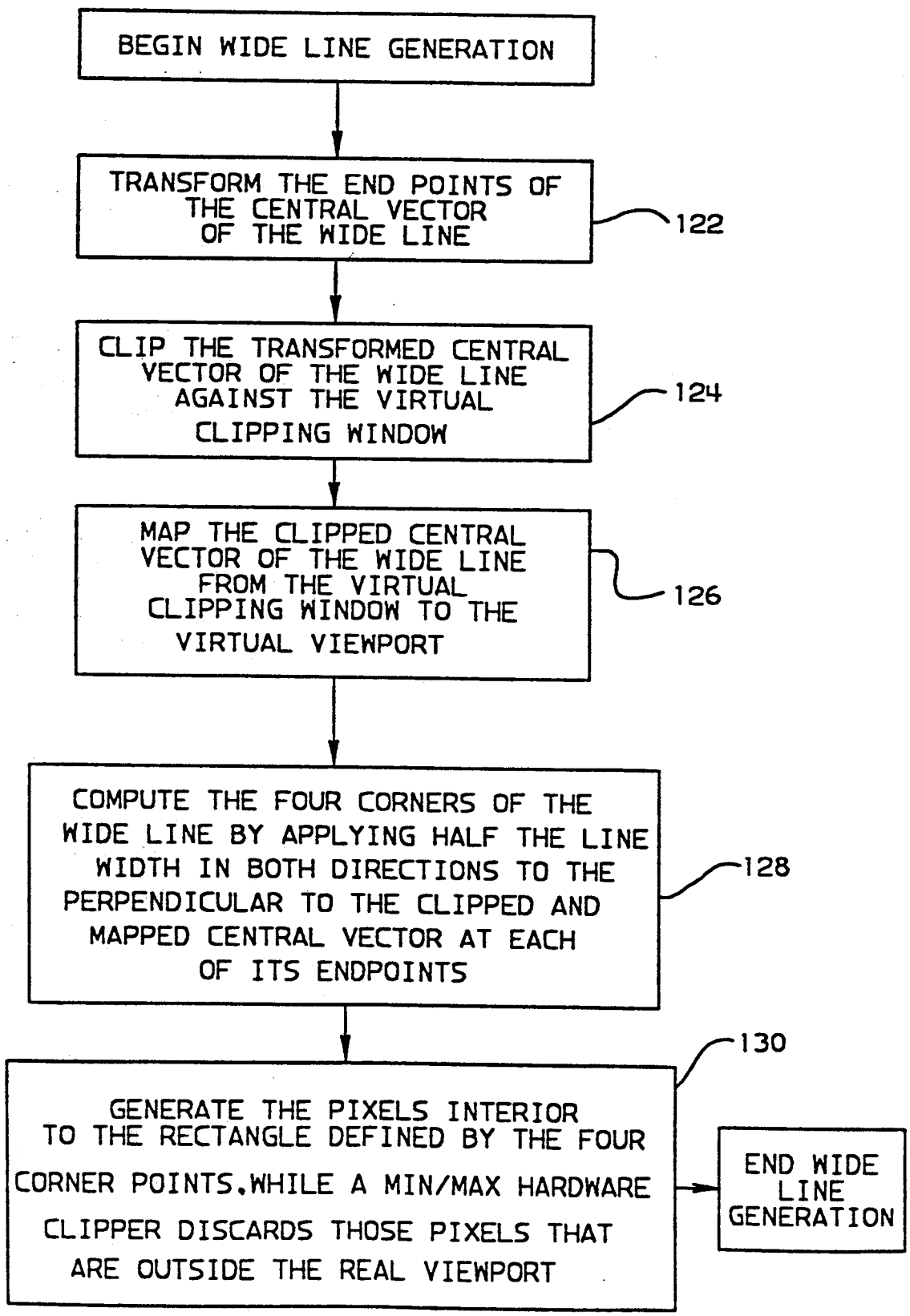
FIG. 8 is a flow chart showing the generation of a wide line in accordance with a preferred embodiment of the present invention.

FIG. 7 shows how the new transformation pipeline is used to advantage in the generation of a rendered wide line. FIG. 8 and FIG. 9 are more detailed flow charts showing how a two stage clipping method is implemented to handle this primitive.

Figure 10:
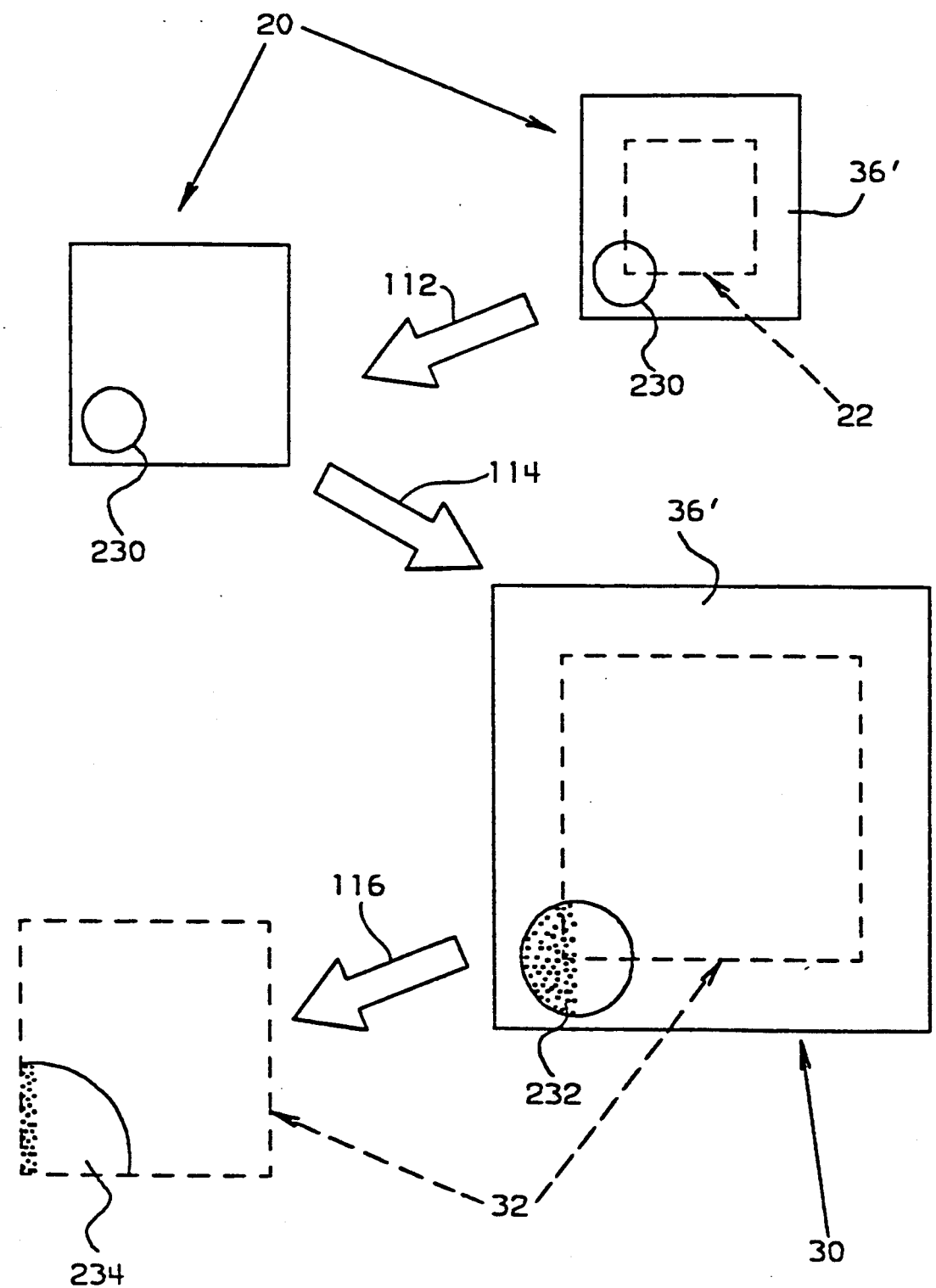
FIG. 10 is a schematic diagram of the a stage clipping method according to the present invention as applied to a pattern filled circle.

Another example of the use of the improved method is shown in FIG. 10, where the problem of clipping a pattern filled circle, previously discussed with reference to FIG. 3, is solved by the present invention.

OPERATION OF A PREFERRED EMBODIMENT OF THE PRESENT INVENTION

FIGS. 1, 2 and 3, schematically showing prior art transformation, clipping, and mapping of geometric primitive, form a base from which the method according to the present invention may be described. In all cases there are three major steps which must be performed in the generation of graphic primitives involving clipping. First, the primitive must be transformed from a first coordinate space to a second coordinate space wherein the transformation may also include rotation, scaling and translation. These operations are all well known in the prior art and are described in the IBM 5080 Model 2 Principles of Operations, IBM Publication Number GA23-2012.

As can be seen with reference to FIG. 2, when a wide line is to be drawn after clipping in a prior art transformation clipping and mapping system, there are areas, namely 60 and 62 shown in the bottom right rectangle where 60 represents the additional area of the wide line which should be drawn within the viewport at the lower left end of the wide line and 62 represents that area of the wide line which should be drawn in the viewport at the upper right end of the wide line. The prior art wide line clipping methods fail with respect to this aspect of the clipping process.

Similarly, referring now to FIG. 3 with respect to a pattern filled circle which is clipped, the pattern filling is not drawn correctly because the starting position information is lost through the clipping and mapping process of the prior art methods.

Figure 4:
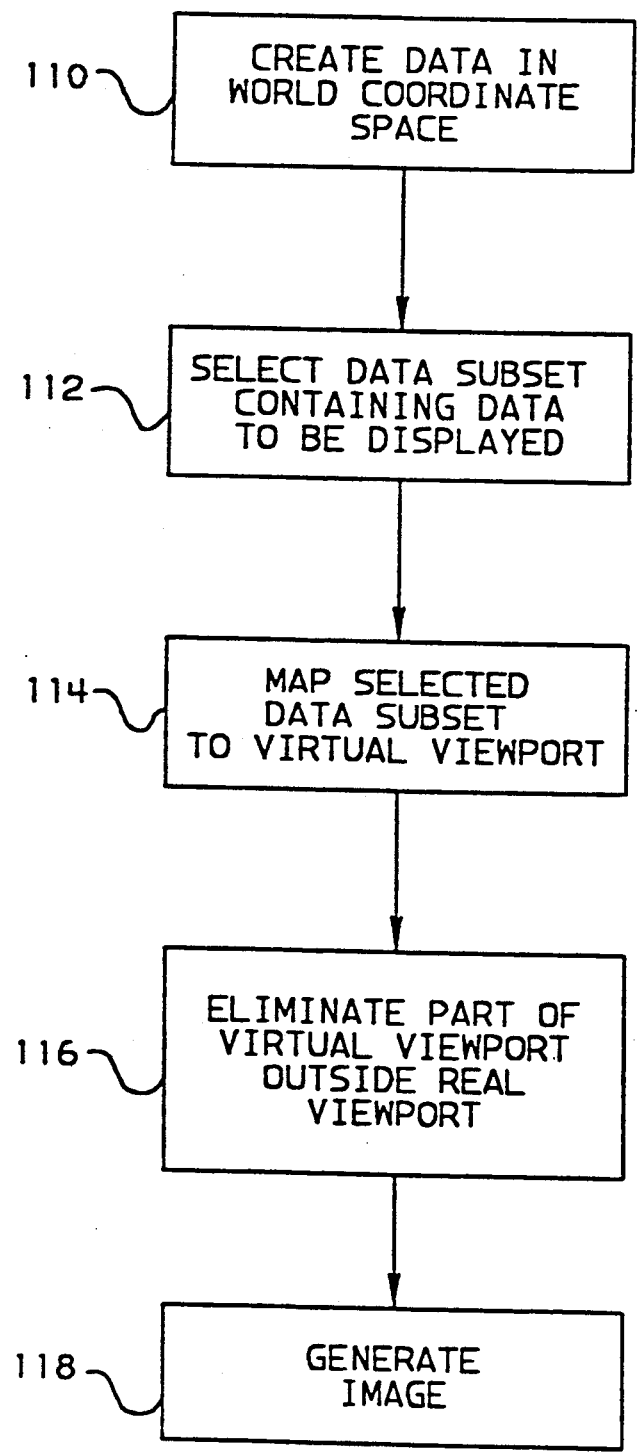
FIG. 4 is a flow chart of a two stage clipping and mapping process in accordance with a preferred embodiment of the present invention.

Referring now to FIG. 4, the transformation clipping and mapping pipeline in accordance with the present invention, will be described.

The first step in the process is to create or transform 110 the data 15 in the world coordinate space which in a typical example may be from minus 32K to plus 32K in all three dimensions. This step may be done by the workstation by moving data from storage into the processor or it may be done interactively with the operator involvement. (See IBM 5080 Principles of Operations for an example of this Operation.)

Next, as more fully shown in FIG. 7, a first clipping stage 112 includes the selection of a data subset containing the data which is to be displayed on the graphics display screen. This stage of clipping employs a clipping volume or window 20 which may be larger than the actual viewing volume 22. In the case of a wide line, for example, the width of the virtual viewing volume may exceed the width of the real viewing volume by an amount equal to the value obtained by applying the inverse of the mapping transformation to one-half the width of the line. The value thus obtained is applied to the horizontal and vertical boundaries of the viewing window to obtain the enlarged clipping window. Thus, for a rectangular viewing volume, there would be added the additional dimension $w'_x/2$ to both sides of the x boundary of the real viewing volume and $w'_y/2$ to both sides of the y boundary of the real viewing volume so that the new virtual viewing volume would have a dimension $x + w'_x$ along the x axis and $y + w'_y$ along the y axis (See 21, 22 in FIG. 7). The inverse mapping transformation results in the $w'_x$ and $w'_y$ values which are related to $w_x$ and $w_y$ by the mapping transform.

The selected data subset is then mapped 114 to a virtual viewport 30. Mapping step 114 includes rendering the final object or expanding the clipped primitive object 17 into displayed object 34. The bounds of object 34 (42, 44, 46, 48) are determined, for a rectangular object, by adding one half the desired width (w/2) to the endpoints of the clipped primitive 17. Next, the rasterization step 118 is performed. After rasterization a second stage of clipping 116 is performed. In this second stage of clipping 116, that part of the virtual viewport 30 outside the real viewport 32 is eliminated so that the resultant image 35 to be displayed contains only those pixels within the real viewport. In this way, areas 60 and 62 with respect to FIG. 2 above will be properly displayed and the wide line will be accurately rendered. The masking process is shown in FIG. 5, and an example of a triangle masked by a circular mask is shown schematically in FIG. 6.

Referring again to FIG. 7, the results of the improved multistage clipping method according to a preferred embodiment of the present invention are schematically described. First, a line primitive 15 is shown in a clipping window 20 against which it is clipped 112 and mapped 114 to a virtual viewport 30 which is larger than the real viewport 32 to allow the wide line 34 to be accurately rendered in the real viewport 32. The area 36 of the virtual viewport outside the real viewport 32 is then discarded leaving the rendered wide line 34 clipped properly to the real viewport 32 for display as object 35.

Referring now to the flowchart of FIG. 8, the method of generation of a wide line primitive, according to the present invention, will be described. A graphics processor transforms end points of a central vector of the wide line much the same as was described with respect to FIG. 1 for prior art transformation 122.

The central vector of the wide line is then clipped by the first clipping stage 124 against the clipping window which, as indicated, may be larger than the viewing window. The clipped central vector is then mapped 126 from the clipping window where the first clipping stage occurs to the virtual viewport. The mapping, as with the transformation above, may be performed in the manner as described in the prior art including the above referenced 5080 Principles of Operation Manual.

The four corners 42, 44, 46, 48 of the wide line 34 (now defined as a polygon) are computed 128 by applying half the line width w in both directions to the perpendicular to the clipped and mapped central vector 15 at each of the end points of the central vector. (See FIG. 7).

Next, pixels interior to the rectangle defined by the four corner points of the wide line 34 are generated 130 while a second stage clipper such as a min/max hardware clipper discards those pixels that are outside the real viewport.

As above, the steps of generating pixels and performing the second stage clipping may be performed by apparatus described in the above referenced Principles of Operation Manual for the IBM 5080 Model 2.

Figure 9B:
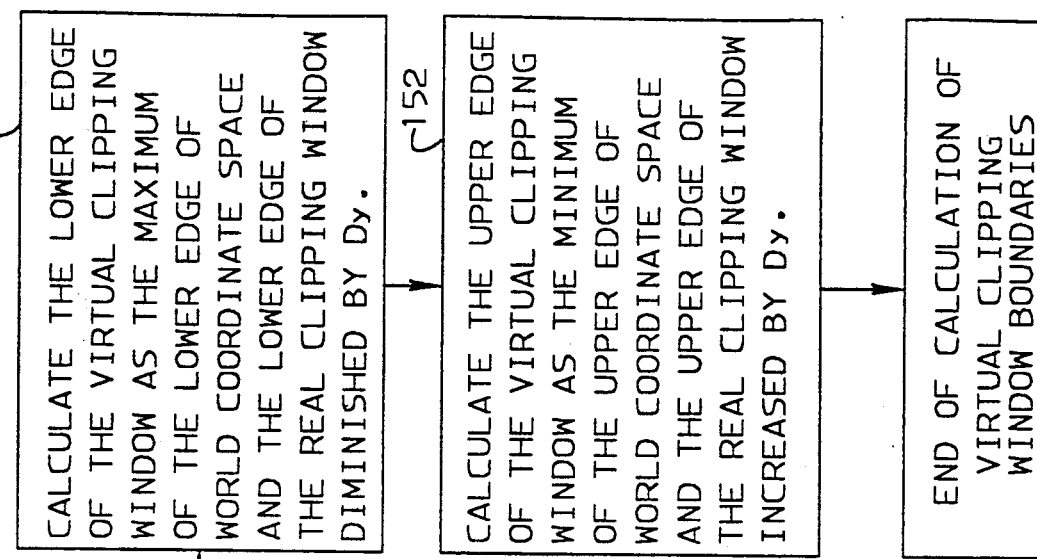
FIG. 9 is a flow chart setting forth the calculation of the virtual clipping boundaries in accordance with a preferred embodiment of the present invention.
Figure 9A:
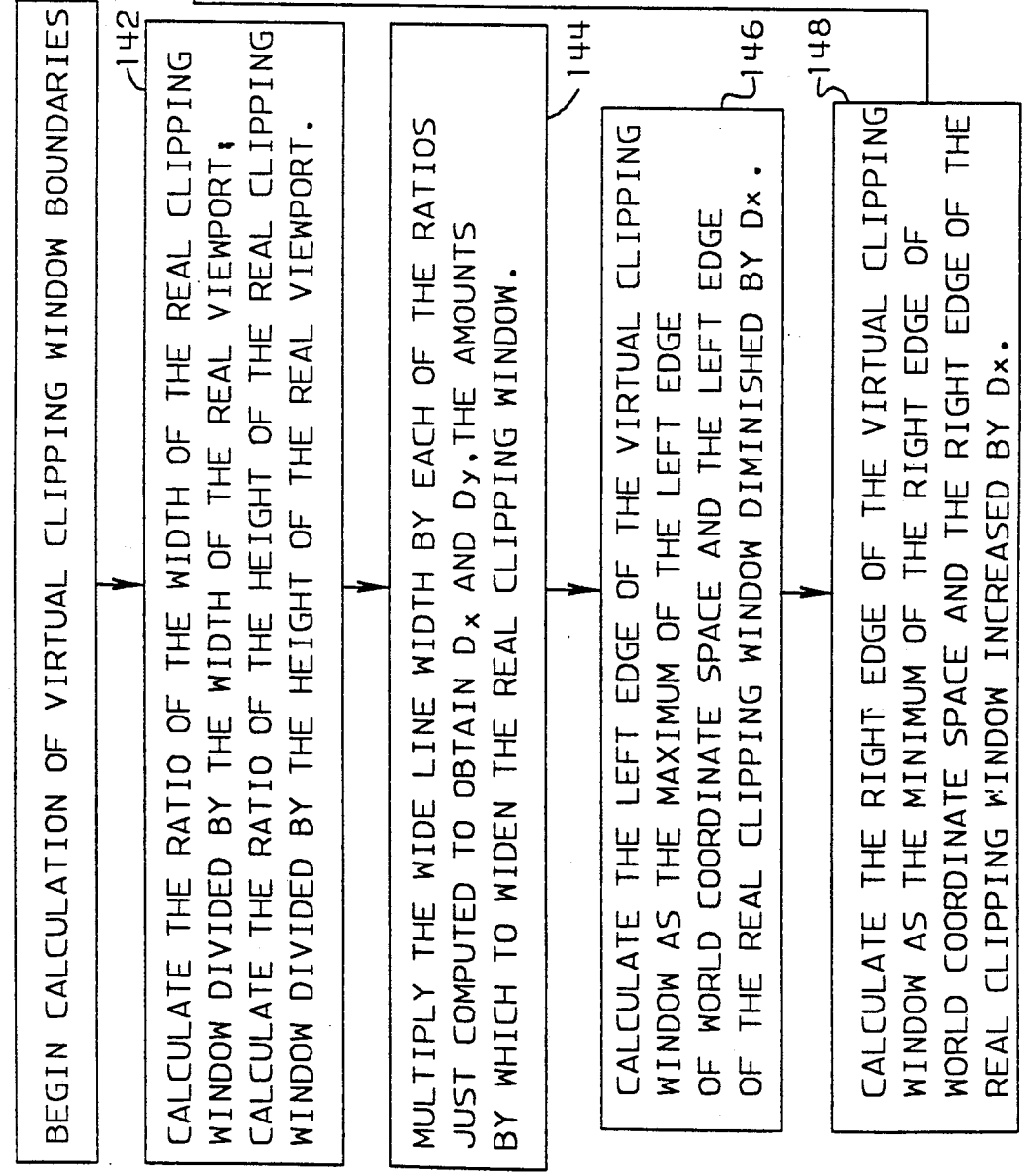

Referring now to FIG. 9a and in FIG. 9b the process for calculating the clipping boundaries will be described.

The ratio of the width of the clipping window 22 to the width of the real viewport 32 is calculated 142. The ratio of the height of the clipping window 22 to the height of the real viewport 32 is calculated 142. These calculations are straightforward ratio calculations and are readily implemented in hardware or system microcode in a graphics display workstation.

The wide line width is then multiplied 144 by each of the ratios computed to obtain $D_x$ and $D_y$, the amounts by which the viewing window 22 must be enlarged to obtain the clipping window.

The left edge of the clipping window is calculated 146 as the maximum of the left edge of the world coordinate space and the left edge of the viewing window diminished by $D_x$. Then, the right edge of the clipping window is calculated 148 as the minimum of the right edge of the world coordinate space and the right edge of the viewing window increased by $D_x$.

The lower edge of the clipping window is calculated 150 as a maximum of the lower edge of the world coordinate space and the lower edge of the viewing window diminished by $D_y$. Then, the upper edge of the clipping window is calculated 152 as the minimum of the upper edge of the world coordinate space and the upper edge of the viewing window increased by $D_y$. FIGS. 8 and 9 describe the preferred embodiment of the present invention as applied to the drawing of a wide line after processing through a two stage clipping system in accordance with the present invention.

FIG. 10 is a schematic diagram of the method in accordance with the present invention applied to a pattern filled circle.

The circular object 230 is first created within the clipping window 20. Clipping window 20 has been defined as having extra clipping space 36' based upon the geometric shape of object 230. In this case, 36' is large enough so that the full circle 230 may be shown within the clipping window. First clipping stage 112 results in the fully drawn circle 230. Mapping and rendering step 114 create the final image 232 in a virtual viewport 30 which is larger than real viewport 32. The rendering portion of step 114 applies the fill attribute to fill one half of the circle as shown at 232. The second stage of clipping 116 then clips the rasterized version of the half filled circle to produce final display object 234 in real viewport 32. FIG. 10 should be compared with FIG. 3 to see the improvement in the display of the desired image after the clipping and masking process according to the present invention has been performed.

While the invention has been described with reference to preferred embodiments thereof, it will be understood by those skilled in the art that various changes in form and detail may be made without departing from the spirit or scope of the invention.

What is claimed is:

1. A method for performing clipping in a graphic workstation by a multistage technique, wherein said method operates on geometric data in said workstation, said data having size characteristics, said method comprising the steps of:
    establishing a first clipping region larger than a desired field of view;
    defining a virtual viewport which is a mapping transformation of said first clipping region, said virtual viewport being defined for accurately clipping geometric primitives; and
    selecting said first clipping region based on said size characteristics of the data being processed.

2. The method of claim 1, further comprising the steps of:
    first clipping said geometric data using said clipping region;
    mapping the clipped geometric data to said virtual viewport; and
    clipping said mapped geometric data to said desired field of view.

3. A method according to claim 1 in which said first clipping region is a volume.

4. A method according to claim 1 in which said first clipping region is a polyhedron.

5. A method for generating pixel data for image display in a graphic display system including the steps of:
    generating geometric data in a world coordinate space;
    selecting a data subset containing geometric data to be displayed, whereby that part of the data outside a first clipping region is eliminated;
    mapping said selected data subset to a virtual viewport;
    eliminating that part of the virtual viewport outside a real viewport; and
    generating pixel data for the image to be displayed.

6. A method for performing multistage clipping in a graphics workstation according to claim 5 in which a mapping transformation is applied from said first clipping region to said virtual viewport, said method comprising the further steps of:
    determining said virtual viewport as a function of said real viewport; and
    calculating said first clipping region by applying the inverse of said mapping transformation to said virtual viewport.

7. A method according to claim 6 in which said virtual viewport is selected as a function of the real viewport and the graphics primitive being processed.

8. A method according to claim 5 in which said first clipping region is a volume.

9. A method according to claim 5 in which said first clipping region is a polyhedron.

10. A method for generating data for image display from a graphics primitive in a graphics display system, comprising the steps of:
    transforming said graphics primitive from a first to a second coordinate space;
    clipping said transformed graphics primitive against a first clipping region;
    mapping said clipped graphics primitive from said first clipping region to a virtual viewport;
    generating pixels from said mapped graphics primitive; and
    clipping those pixels generated from said mapped graphics primitive that are outside a real viewport.

11. A method according to claim 10 wherein said first clipping region has dimensions that are related to dimensions of a viewing region by a function of said graphics primitive.

12. A method according to claim 10 in which said virtual viewport is selected as an enlargement of the real viewport such that if the mapped graphics primitive does not enter the virtual viewport, the pixels generated from said graphics primitive do not enter the real viewport.

13. A method according to claim 10 in which said virtual viewport is selected as the minimal enlargement of the real viewport such that if the mapped graphics primitive does not enter the virtual viewport, the pixels generated from said graphics primitive do not enter the real viewport.

14. A method according to claim 10 in which said first clipping region is a volume.

15. A method according to claim 10 in which said first clipping region is a polyhedron.

* * * * *